United States Patent [19]

D'Hont et al.

[11] Patent Number: 5,274,392
[45] Date of Patent: Dec. 28, 1993

[54] TILTED ANTENNA

[75] Inventors: Loek D'Hont, Almelo, Netherlands; Josef H. Schuermann, Oberhuemmelen, Fed. Rep. of Germany

[73] Assignee: Texas Instruments Incorporated, Dallas, Tex.

[21] Appl. No.: 818,002

[22] Filed: Jan. 8, 1992

[51] Int. Cl.$^5$ .............................................. H01Q 7/00
[52] U.S. Cl. ...................................... 343/866; 340/505
[58] Field of Search ............... 340/505, 572; 343/866, 343/788, 741, 742, 745, 868, 869

[56] References Cited

U.S. PATENT DOCUMENTS

| | | | |
|---|---|---|---|
| 3,754,226 | 8/1973 | Fearon | 343/788 |
| 4,326,198 | 4/1982 | Novikoff | 340/572 |
| 4,384,281 | 5/1983 | Cooper | 343/867 |
| 4,679,046 | 7/1987 | Curtis et al. | 343/867 |

FOREIGN PATENT DOCUMENTS 0186401 10/1984 Japan ........................ 343/866

*Primary Examiner*—Michael C. Wimer
*Assistant Examiner*—Tan Ho
*Attorney, Agent, or Firm*—Rebecca A. Mapstone; James C. Kesterson; Richard L. Donaldson

[57] ABSTRACT

A novel antenna system disposed around a conveyor belt for the interrogation of objects passing through the antenna which overcomes centralized dead zone problems is disclosed. A frame antenna is disposed around a conveyor belt and is tilted to form, for example, a 30 deg. angle with the vertical longitudinal plane of the conveyor belt, which is perpendicular to the horizontal plane within which the conveyor belt lies, and a 30 deg. angle with the transverse axis of the conveyor belt. In this way, a "dead-zone" free read area is formed to facilitate the read of a transponder oriented in any manner as it moves along the conveyor belt.

2 Claims, 2 Drawing Sheets

TILTED ANTENNA

BACKGROUND OF THE INVENTION

The invention relates to an interrogating station for interrogation and identification—using high-frequency signals—of an object which is moved along an interrogation path such as a conveyor, said station being provided with a passive transponder fixed to the object for transmitting its own identification code in response to an interrogation signal, and an antenna system operable for transmitting the interrogation signal and for receiving the identification code respectively. Such an interrogating station is known in practice.

With such a station objects on which or in which a transponder is fixed are identified using the identification code belonging to the transponder. For this, a high-frequency carrier signal is transmitted in the interrogation path and received by the transponder. The transponder is a so-called passive transponder which is excited or charged by the above-mentioned carrier signal. In reaction to this, the transponder transmits the above-mentioned identification code, which is unique for each transponder. The design is generally such that during a particular interrogation period one or more successive transponders are excited or charged, following which the identification code is transmitted in the succeeding receiving period by the transponders.

The antenna system used in such an interrogating station is disposed near the interrogation path, such as a conveyor, along which the objects, such as pieces of luggage, are being moved. The antenna system used for the interrogation and reading or receiving of the identification code is disposed near or on the conveyor. It will be clear that the use of relatively small single antennae gives inadequate cover of the interrogation path, so that dead angles or zones in which no reading takes place occur.

In practice, attempts have been made to remedy this by e.g. fitting a frame antenna of rectangular or square shape around the conveyor. The object is, of course, to obtain a reading in every point within the interrogation path for all possible transponder orientations. Such a frame antenna is then fitted at right angles to the conveyor.

Experiments with objects with transponders fitted to them moved along the conveyor in all orientations relative to a frame antenna have shown:

that for horizontal transponders with their axis parallel to the central axis of the antenna the interrogation/-reading behaviour was good; and that for transponders in a vertical plane with the transponder axis horizontal or vertical the interrogation/reading behaviour was good except in a clear dead zone around the central axis of the frame antenna. No reading takes place in this dead zone. This is due to the fact that the elongated antenna of the transponder is sensitive essentially in one direction.

The object of the invention is to eliminate this problem.

SUMMARY OF THE INVENTION

This is achieved in an interrogating station of the type mentioned in the preamble in that the antenna system comprises a frame antenna which is fixed round the conveyor, that, on the one hand, the intersection of the antenna frame plane with the vertical longitudinal plane of the conveyor forms an appreciable angle with the vertical on the conveyor and, on the other, the intersection of the antenna frame plane with the horizontal longitudinal plane of the conveyor forms an appreciable angle with the transverse axis of the conveyor.

It was surprisingly found in the case of this embodiment according to the invention that a rotation of the plane running through the frame antenna, the frame plane, both relative to the vertical on the conveyor and relative to the transverse plane on the conveyor produces virtually total elimination of the dead zones for all transponder orientations.

BRIEF DESCRIPTION OF THE DRAWINGS

The invention will be explained in greater detail with reference to an example of an embodiment shown in the drawings, in which.

DESCRIPTION OF THE PREFERRED EMBODIMENTS

Figure 1:
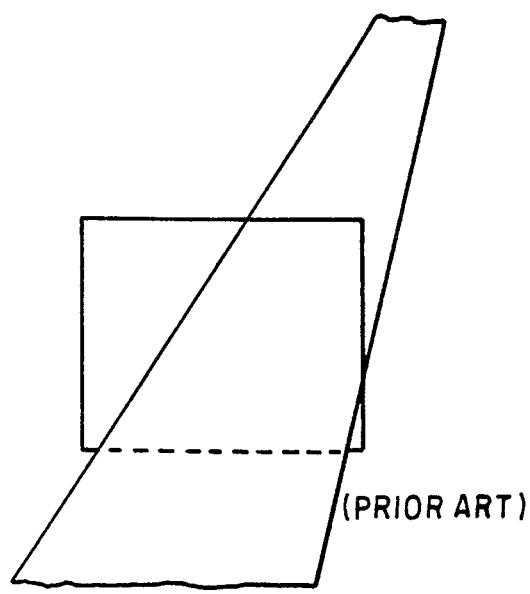
FIG. 1 shows a perspective view of a conveyor with frame antenna according to the state of the art.

FIG. 1 gives a view of a frame antenna from the state of the art disposed round a conveyor for pieces of luggage etc.

Figure 2A:
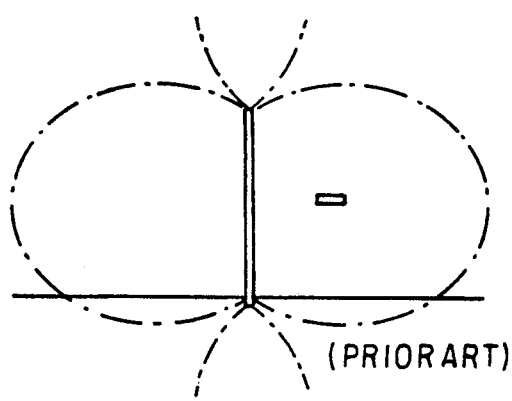
FIGS. 2a and 2b show radiation patterns of the frame antenna of FIG. 1 for different transponder orientations.
Figure 2B:
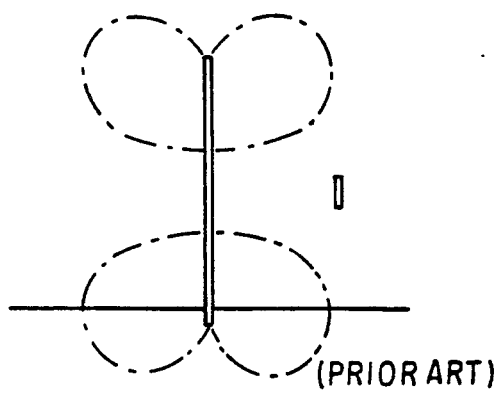

FIGS. 2a and 2b show the radiation patterns for the interrogation for a horizontal transponder axis orientation parallel to the central antenna axis and for a vertical and horizontal transponder axis orientation parallel to the frame antenna plane respectively. From FIG. 2a there follows a good reading and from FIG. 2b there follows a good reading except when the transponder is in the centre in the dead zone of approximately four inches in diameter.

Figure 3A:
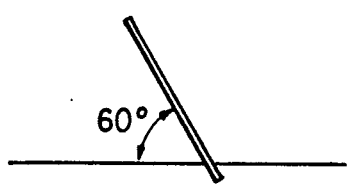
FIGS. 3a and 3b show a side view and top view respectively of the frame antenna according to the invention.
Figure 3B:
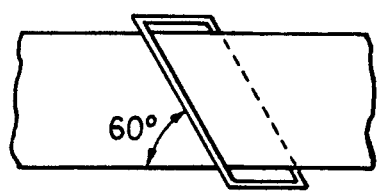

It has now surprisingly been found that through a rotation of the frame antenna in two directions the chance of dead zones for the worst case of transponder axis orientation is virtually certain to be eliminated. FIG. 3a shows a side view from which the rotation of the frame antenna relative to the vertical on the conveyor through an appreciable angle of e.g. 30″ can be seen, and FIG. 3b shows a top view from which the rotation of the frame antenna relative to the transverse plane on the conveyor through an appreciable angle of e.g. 30″ can be seen. It appears that in this arrangement of the frame antenna the transponder, irrespective of its axis orientation, will always be subjected to an active field component of the electromagnetic field.

Figure 4A:
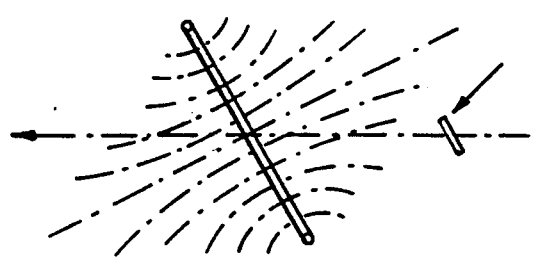
FIGS. 4a, 4b and 4c show respectively a view of the field line course of the frame antenna of FIG. 3, of a single field line, and of the corresponding reading for a transponder as a function of axis orientation thereof.
Figure 4B:
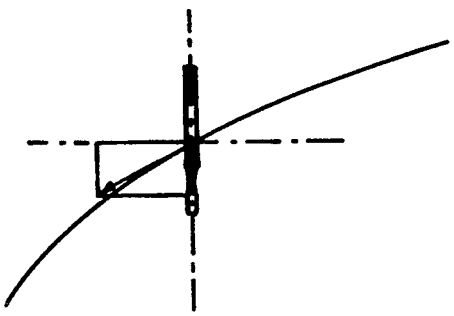
Figure 4C:
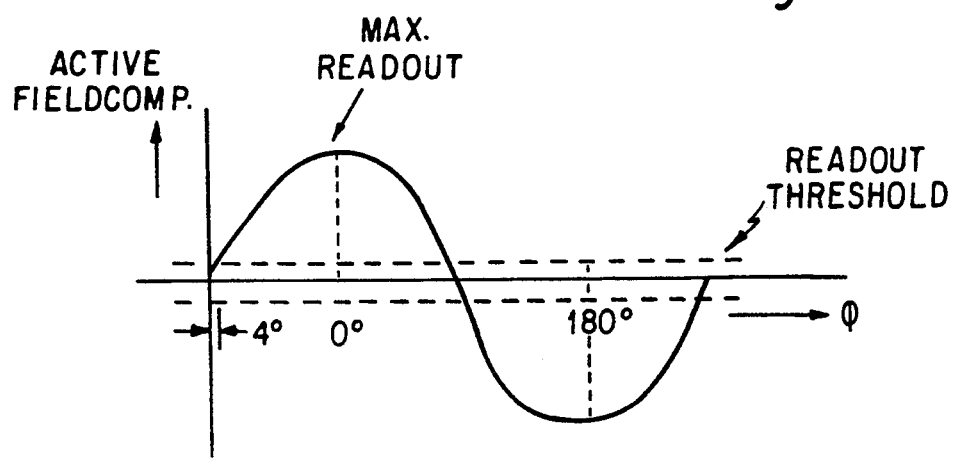

FIG. 4a now shows that in an arrangement according to FIG. 3 a transponder which is moved along the longitudinal axis of the conveyor through the centre of the frame antenna, and the axis orientation of which runs parallel to the plane of the frame antenna, gives a reading up to twice: the first time when the transponder approaches the antenna, and the second time when the transponder enters the radiation pattern again from the dead zone. FIG. 4b shows for an arbitrary field line the way in which on passage through the frame antenna an active field component and a non-active field component occur in the transponder. Finally, FIG. 4c shows a graph of the transponder coupling versus orientation measured in the centre of the frame antenna, i.e. of the active field component occurring in the transponder antenna as a function of the orientation of the transponder axis relative to the frame antenna plane.

Figure 5A:
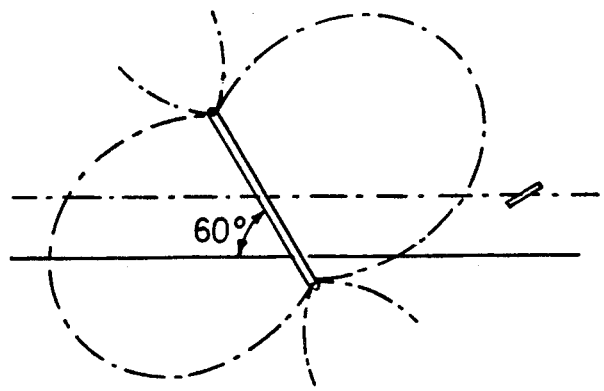
FIGS. 5a and 5b show side views of the radiation pattern of the frame antenna of FIG. 3 for the best and worst transponder coupling respectively.
Figure 5B:
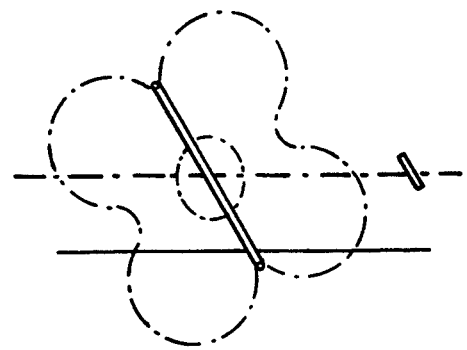

Finally, FIGS. 5a and 5b show in side view the radiation patterns for a transponder moving through the centre of the antenna having an axis orientation parallel to the central axis of the frame antenna and having an axis orientation parallel to the frame plane of the antenna respectively.

The conclusion is that for any transponder orientation between the best case (FIG. 5a) and the worst case (FIG. 5b) readings will always take place, irrespective of the position of the transponder.

We claim:

1. The antenna system for interrogation and identification of a transponder, wherein the transponder moves along an interrogation path comprising:
a frame antenna disposed around the interrogation path for interrogating a transponder moving along said interrogation path, said frame antenna defining a plane intersecting said interrogation path and oriented such that said plane forms an angle with the vertical longitudinal plane of the interrogation path and simultaneously said plane forms an accute angle with the transverse axis of said interrogation path.

2. The antenna system of claim 1, wherein said acute angle is 30°.

* * * * *